Figure 1:
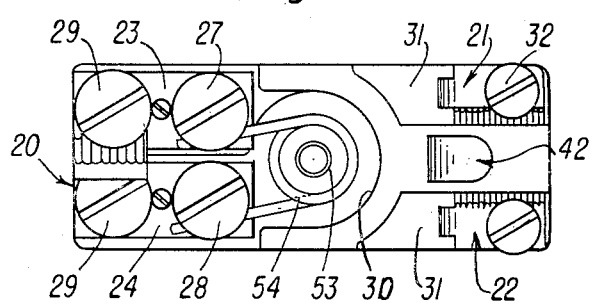

Feb. 7, 1961   D. F. WILLCOX ET AL   2,971,072
THERMAL OVERLOAD AND RESET ASSEMBLY
Filed April 17, 1959   3 Sheets-Sheet 1

*Fig. 17*   *Fig. 18*

INVENTORS
Dale F. Willcox
William Few &
Irving Krieger
BY
Byron Hume Groen & Clement Feb. 7, 1961 D. F. WILLCOX ET AL 2,971,072
THERMAL OVERLOAD AND RESET ASSEMBLY
Filed April 17, 1959 3 Sheets-Sheet 2

INVENTORS
Dale F. Willcox
William Few &
Irving Krieger
BY
Byron Hume Groen & Clement Feb. 7, 1961 D. F. WILLCOX ET AL 2,971,072
THERMAL OVERLOAD AND RESET ASSEMBLY
Filed April 17, 1959 3 Sheets-Sheet 3

INVENTORS
Dale F. Willcox,
BY William Few &
Irving Krieger
Byron Hume Groen & Clement

United States Patent Office 2,971,072
Patented Feb. 7, 1961

2,971,072

THERMAL OVERLOAD AND RESET ASSEMBLY

Dale F. Willcox, Aurora, William Few, Batavia, and Irving W. Krieger, St. Charles, Ill., assignors to Furnas Electric Company, Batavia, Ill., a corporation of Delaware Filed Apr. 17, 1959, Ser. No. 807,212

6 Claims. (Cl. 200—124)

The invention relates to electric switches and has reference more particularly to an overload release switch of the thermal type with manual reset means incorporated therewith to form a unitary assembly especially designed for motor starters and similar electrical apparatus.

The primary object of the invention is to provide a thermal overload release switch which will embody trip-free features, which can be manually reset by the operator provided the overload conditions have been corrected, and a device of such character which will comprise a unitary assembly having relatively few parts and one that can be economically manufactured.

A more specific object of the invention is to provide an overload release switch of the thermal type incorporating the conventional form of solder pot and reset plunger in combination with additional structure in the form of a wedge and actuator for the wedge so that the assembly will be fool-proof, protecting the electrical circuit from excess current flow at all times and regardless of any possible misuse of the manual actuator.

Another object resides in the provision of a thermal overload and reset assembly as described wherein the wedge and reset plunger have camming action for effecting a resetting operation and wherein the actuator, wedge and reset plunger coact in a manner to prevent closing of the contacts if and as long as the overload conditions exist in the circuit being protected.

Another object is to provide a thermal overload and reset assembly wherein the movable contact will have snap movement to and from the fixed contacts, whereby to eliminate arcing in both opening and closing actions of the switch.

A still further object is to provide a manually reset electrical circuit protector having captive members for the fixed contacts since a particular orientation is required of the members for insertion in the housing followed by a turn of approximately forty-five degrees for assembly with screws and ears being provided for retaining the contacts in assembled position.

Figure 2:
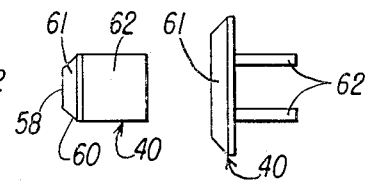
Figure 2:
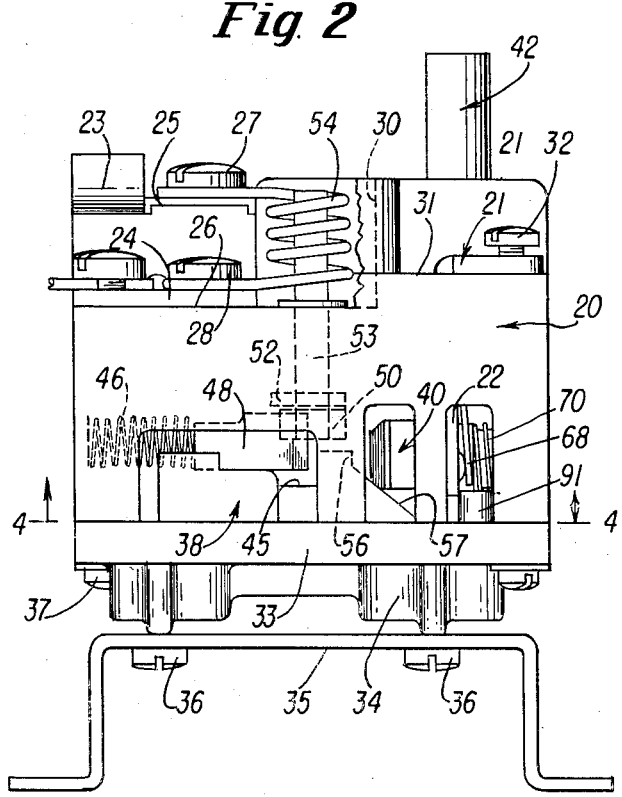
Figure 3:
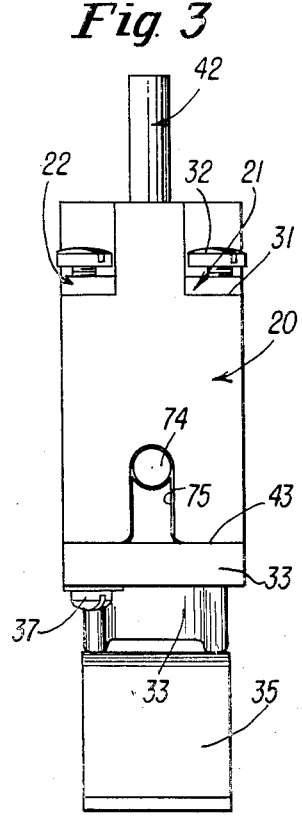
Figure 4:
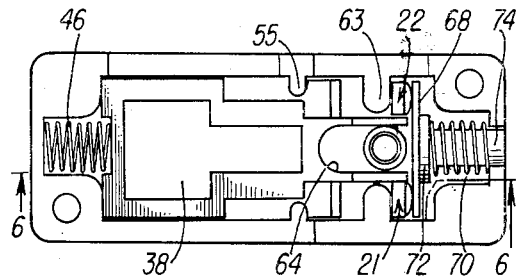
Figure 5:
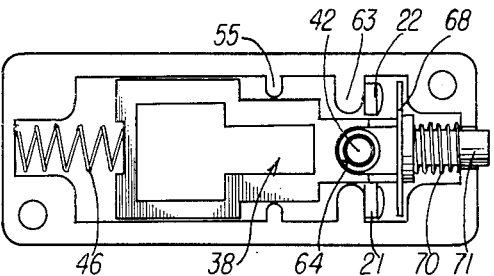
Figure 6:
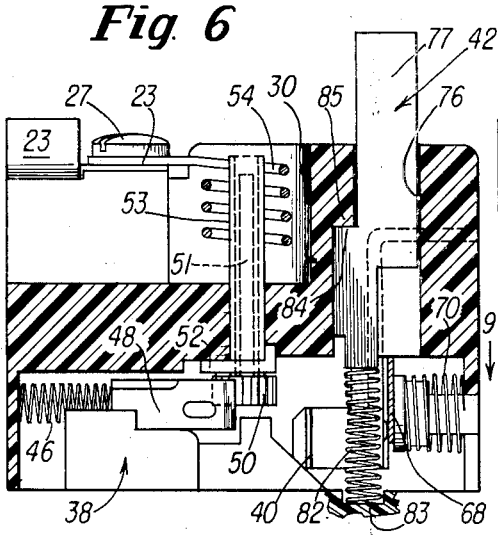
Figure 7:
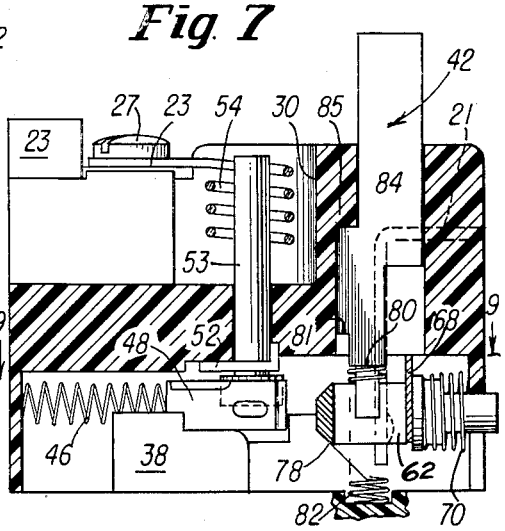
Figure 8:
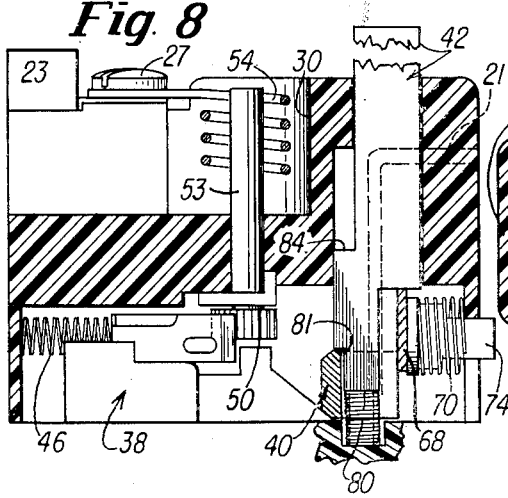
Figure 9:
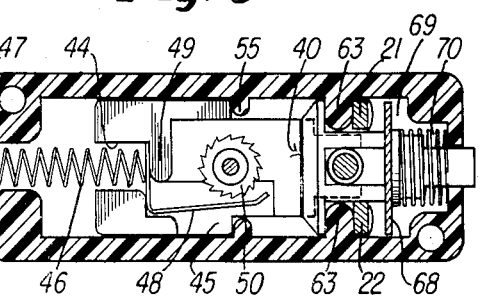
Figure 10:
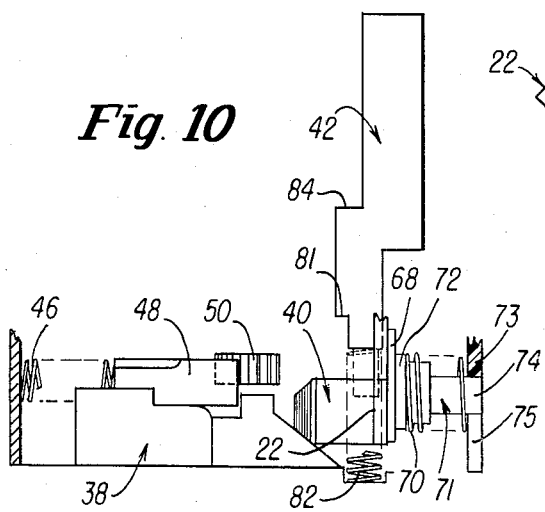
Figure 11:
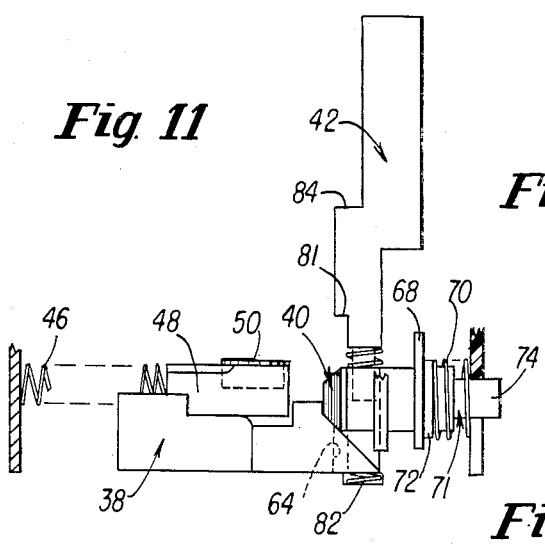
Figure 12:
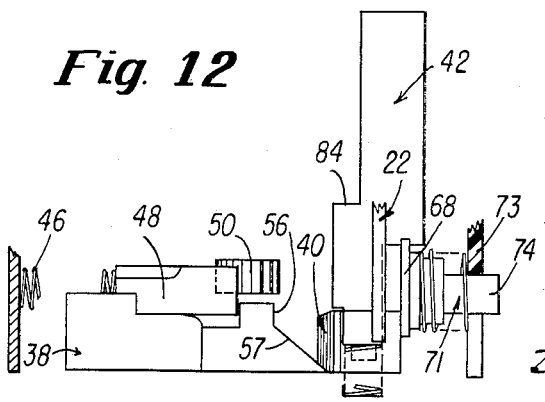
Figure 13:
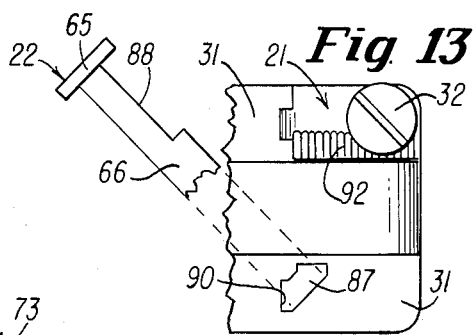
Figure 14:
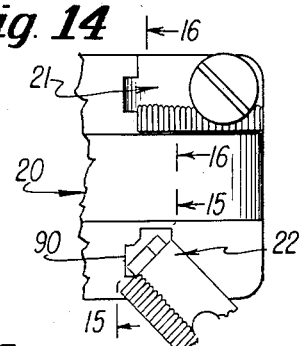
Figure 15:
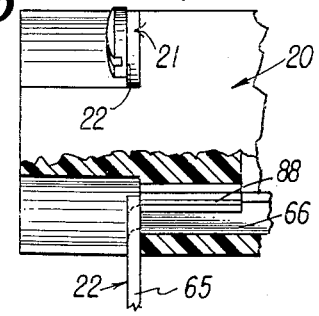
Figure 16:
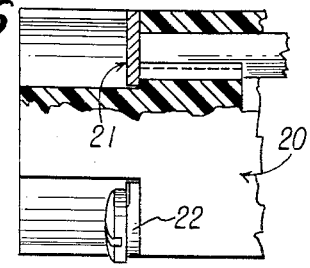

Other objects and advantages will become apparent from the following description and accompanying drawings wherein, Figure 1 is a top plan of the thermal overload and reset assembly of the invention, Figure 2 is a side elevational view of the assembly shown in Figure 1, Figure 3 is a front elevational view, Figure 4 is a bottom plan view, with the base member removed, taken substantially along line 4—4 of Figure 2 and showing the switch contacts in closed position, Figure 5 is a bottom plan view similar to Figure 4 but showing the switch contacts in open tripped position, Figure 6 is a longitudinal vertical sectional view taken substantially along line 6—6 of Figure 4 and showing the switch contacts in closed position, Figure 7 is a longitudinal vertical sectional view similar to Figure 6 but showing the switch contacts in open tripped position, Figure 8 is a longitudinal vertical sectional view also similar to Figure 6 but illustrating the action of the actuator and wedge when depressed for resetting the switch, Figure 9 is a horizontal sectional view taken substantially along line 9—9 of Figure 7, the switch contacts being shown in open position, Figure 10 is a fragmentary view illustrating the normal position of the actuator, wedge and reset plunger when the switch contacts are closed, Figure 11 is a fragmentary view similar to Figure 10 but showing the position of the reset plunger after the same has been tripped to open the contacts of the switch, Figure 12 is likewise a fragmentary view similar to Figure 10 but showing the actuator and wedge in depressed position for resetting the contacts, Figures 13 and 14 are fragmentary top plan views illustrating the manner of insetting a fixed contact within the switch housing, Figure 15 is a fragmentary sectional view taken substantially along line 15—15 of Figure 14, Figure 16 is a fragmentary sectional view taken substantially along line 16—16 of Figure 14, Figure 17 is a side elevational view of the wedge, and Figure 18 is a top plan view of the wedge.

The switch housing is best shown in Figures 1 and 2 wherein the numeral 20 indicates the body portion of the switch which is formed of any suitable plastic or similar insulating material and has a plurality of ledges or supporting surfaces for the fixed contacts 21 and 22 and for the terminals 23 and 24. The ledges 25 and 26 at the rear of the housing respectively support the terminals 23 and 24 and with which the terminal screws 27, 28 and 29 are associated. Adjacent the ledges 25 and 26 the housing is formed with a well 30 for receiving the solder pot device to be presently described. The front ledges 31 support the fixed contacts 21 and 22 and which are held to the housing by the screws 32. The base plate 33 closes the bottom open end of the housing and accordingly said base plate assists in retaining parts of the switch within the housing. The protuberances on the bottom of the base plate have the metal supporting frame 35 secured thereto by the screws 36 and the base plate is in turn releasably secured to the body portion of the switch by the screws 37.

The switch mechanism within the housing consists of a reset plunger 38, Figures 10, 11 and 12, a wedge 40 and an actuator 42. For resetting purposes, the actuator 42 is reciprocated in a direction longitudinally of the same and the actuator contacts directly with the wedge 40 which has camming engagement with the reset plunger 38, causing said plunger to move in a sliding manner on the top inside surface 43 of the base plate 33. By reason of the camming action it will be noted that the reset plunger moves in a direction which is at right angles to the movement imparted to the actuator. The plunger has flat bottom surfaces which rest on the base plate. The top of the plunger, as best shown in Figure 9, has recesses 44 and 45 formed therein. The recess 44 is formed in the rear end of the plunger, whereas recess 45 is formed in its top surface. One end of the coil spring 46 is anchored in recess 44 and the other end of the coil spring engages a rear wall 47 of the body portion 20. The coil spring accordingly urges the plunger in a forward or tripping direction towards the right, Figures 7 and 9, and this action of the plunger will thus produce an opening of the switch contacts. Recess 45 contains a spring member 48, the bent end of which is located in contact with abutment 49 and the coil spring 46 thereby assists in releasably retaining the spring member in assembled relation on the plunger. Said spring member functions as a pawl with respect to the ratchet wheel 50 comprising part of the solder pot structure.

Said ratchet 50 is fixed to a shaft 51 journalled by the bushing 52 and which shaft extends within the barrel 53, being spaced from the inside surface of said barrel. The barrel is suitably anchored in the body portion 20 and the same extends upwardly within the well 30. The heating coil 54 surrounds the barrel 53, having spaced relation therewith, and said coil is connected into the electric circuit by the screws 27 and 28 which connect the heating coil to the terminals 23 and 24. The terminals in turn have a connection to the terminals of the electric circuit by means of the screws 29. As is well known in solder pot devices, the shaft 51 is normally sealed to the barrel 53 by eutectic solder which occupies the space between the parts. The ratchet 50 is thereby prevented from turning and the pawl 48 will hold the reset plunger in a tensioned position since the coil spring 46 will be compressed. This position of the parts is shown in Figures 2, 6 and 10. However, when an overload condition develops, the heating coil 54 will melt the eutectic solder, releasing shaft 51 and ratchet 50 for rotation. The spring 46 will thereupon move the reset plunger 38 to the right to in turn move the wedge 40 and open the switch contacts. The stops 55 formed on the inside of the housing 20 will limit movement of the plunger in this direction. The coaction taking place between the plunger and wedge in both resetting and tripping operations will now be described.

The front edge of the plunger 38 is formed with a vertical ledge 56 and with a bevelled apron 57. The wedge 40, Figures 17 and 18, has surfaces complementary to that of the plunger. For example, the flat face 58 of the wedge is adapted to have contact with ledge 56 and the bevelled edge 60 is adapted to have camming engagement with apron 57. The flat face 58 and bevelled edge 60 are formed on the body 61 of the wedge, said wedge being additionally provided with bifrucated legs 62. Wedge 40 is located between the posts 63 formed on the inside of the housing and thus the body 61 of the wedge will at times have sliding contact with the posts. The bifurcated legs 62 have the additional function of accommodating the reduced end of the actuator and spring therefor as will be presently described. For the same reason, the bevelled apron 57 of the reset plunger is bifurcated at 64, as best shown in Figure 11.

The fixed or stationary contacts of the switch, previously identified as 21 and 22, Figure 1, each consists of a member having an exterior portion 65, Figure 13, and an interior depending portion 66, the former portions being supported on the ledges 31 and the latter portions depending parallel with and having contact with a post 63. The depending portions of the fixed contacts accordingly use a post 63 as a backing member. It will also be observed that the fixed contacts are spaced on respective sides of the housing and accordingly the legs 62 of the wedge have a position between the contacts and which permits free movement of the wedge. The movable contact 68 is located within recess 69 provided by the housing 20 and the said contact is freely movable in a direction to and from the depending portions of the fixed contacts so as to engage the same and thus control the opening and closing of the electric circuit. The coil spring 70 yieldingly forces the movable contact 68 in a direction toward the left, Figures 7 and 9, and said coil spring thus effects a closing of the circuit unless the contact is maintained in open position by the legs 62 of the wedge 40. Said coil spring 70 is carried by freely movable pin 71 having an enlarged base 72, which directly engages the movable contact 68 and supports one end of the spring. The other end of the spring engages the front wall 73 of the housing and the reduced end 74 of the pin extends through an opening 75 provided therefor in the front wall. The length of the pin 71 is such that its reduced end 74 is flush with the outside surface of the housing wall when the switch contacts are closed, as shown in Figures 2, 6, and 10. When the switch contacts are open, the reduced end 74 projects beyond the front wall, as shown in Figures 7, 9 and 11, so that a visual indication is available to the operator of this fact. Whereas the right-hand side of the movable contact 68 is in engagement with the base 72 of the pin 71, the left-hand side of the movable contact is engaged by the legs 62 of the wedge. The movable contact is thereby maintained under control at all times.

The actuator 42 is substantially rectangular in cross section for approximately its full length and the actuator, having the special shape as shown in the drawings, is mounted for vertical reciprocating movement within the passage 76 formed in the switch housing. The portion 77 of the actuator 42 extends above the housing for convenient access by the operator. The bottom end of the actuator is reduced in size and made circular to form the end portion 78. Said end portion thus provides shoulder 80 and above the same a second shoulder 81 is formed on the actuator. Shoulder 80 engages with a coil spring 82 which loosely surrounds the end 78 and is confined between the shoulder 80 and the base plate 33, which has a recess 83 for receiving the bottom end of said spring. The spring thus yieldingly forces the actuator 42 in an upward direction until the third shoulder 84 engages with the abutment 85 of the housing. The circular end 78 and part of the coil spring 82 extends between the legs 62 of the wedge. The space between the legs is made wide enough so as to receive the structure without interference as regards the movement of either part.

Assuming that the switch contacts are closed by engagement of the movable contact 68 with the depending portions of the stationary contacts 21 and 22, it will be observed that the reset plunger is held in retracted position by engagement of the pawl 48 with the ratchet wheel 50. In this position of the plunger and movable contact, the wedge is free, being retained, however, in proper assembled position by the fact that the legs of the wedge extend between the post 63 and with the body of the wedge being located between the posts and the plunger. The actuator 42 is normally biased into an upward position by the coil spring 82, and with the parts as described, it will be noted that the actuator 42 can be depressed against the tension of spring 82 and the actuator can even be held in a depressed position without interfering with the freedom of the wedge and without causing any actuation of the wedge. The contacts of the switch will thus maintain a closed circuit position until an overload condition exists. The overload condition will heat the coil 54 and eventually the eutectic solder in barrel 53 will melt to release shaft 51. The ratchet 50 is now free to rotate and such action takes place to release the reset plunger for movement in a direction towards the right as a result of tension exerted by coil spring 46. The ledge 56 of the plunger will engage the flat face 58 of the wedge and thus said wedge will also be moved in a direction towards the right, whereby the legs 62 will effect an opening action of the movable contact 68. The switch contacts have now been tripped by the overload condition existing in the electrical circuit, and even though the operator may have held the actuator depressed, the above operations will nevertheless take place to open the switch.

For resetting purposes, the operator depresses the actuator, moving the same downwardly against the tension of the coil spring 82. The shoulder 81 will contact the body of the wedge since the wedge is now confined between the plunger and the movable contact, having a location in its extreme right-hand position, as a result of which the body 61 is in contact with the posts 63. Downward movement of the actuator will move the wedge in a downward direction and thus the wedge cams the plunger rearwardly due to the coaction which the bevelled edge 60 has with the bevelled apron 57. If the overload conditions have been relieved, the ratchet 50 will be held against rotation and re-latching of the pawl 48 with the ratchet wheel is effected. The plunger is thereby again held in retracted position. However, as long as the actuator is held depressed, the switch contacts are maintained in open position and it is further noted that should the overload conditions still exist, then upon release of the actuator, the reset plunger would take over and cause the wedge to hold the movable contact in open position. The switch contacts are permitted to close upon release of the actuator only in the event the overload conditions have been corrected.

When the actuator is released, it moves up under tension exerted by coil spring 82, and with the overload conditions relieved, the wedge is free to move rearwardly and allow the movable contact to close with a snap movement. Also the opening action of the movable contact is extremely fast and accordingly an important advantage of the present structure resides in the fact that the contacts of the present protective switch have such rapid open and closing movement as to prevent arcing.

The manner in which the fixed contacts 21 and 22 are assembled and held captive is disclosed in Figures 13 to 16. An opening 87 of special shape is formed in each ledge 31 and the opening is oriented diagonally of the ledge in which direction the size of the opening is a maximum. This determines the angularity of the fixed contact when inserting the depending portion 66 in the opening for assembly within the housing. When the upper end of reduced width 88 reaches the opening, the contact member can be turned to locate the said upper end against the shoulder 90 and which will align the terminal end 65 with the ledge 31. Continued insertion of the contact member will locate the end thereof between a post 63 and an ear 91, Figure 2, so that the member is securely held in assembled position by the terminal screw 32. The terminal portions of all the contacts can be serrated as at 92 to assure the best electrical connection with the wire affixed thereto.

In the present thermal overload and reset assembly, the reset plunger 38 and the wedge 40 have unitary action in opening the contacts. More particularly, when the plunger is tripped it moves toward the right and picks up the wedge so that both elements then move as a unit to open the movable contact 68. The actuator 42 is capable of movement only in a direction at right angles to the reciprocating movement of the reset plunger. Thus in order to reset the plunger, camming action must take place between the wedge and plunger for which purpose these members have sloping surfaces at approximately a forty-five degree angle. It is also important to note that although the wedge can be depressed to move the plunger to the left for resetting purposes, nevertheless the movable contact will be maintained in an open position. In fact, the open position of the movable contact is maintained until the actuator is withdrawn and only then is the contact 68 permitted to close provided the plunger is held in latched position, the overload conditions having been relieved. Accordingly, the wedge is an important and unique element in the present combination. In the tripped position of the plunger the wedge is held against the posts 63, whereas with the plunger in latched position, the wedge is loose and free to move to a limited extent, being confined, however, between the posts and the said latched plunger.

We claim:

1. In a protective switch, in combination, a pair of fixed contacts positioned in spaced relation, a movable contact adapted to have movement towards and from the fixed contacts for engaging with the same to close an electrical circuit, means yieldingly biasing the movable contact in a circuit closing direction, a reset plunger, additional means yieldingly biasing the reset plunger in a circuit opening direction, a camming wedge interposed between the movable contact and the reset plunger, said wedge having leg portions located between the pair of fixed contacts for engagement with the movable contact and said wedge having a bevelled edge for camming engagement with a bevelled apron on the reset plunger, said wedge transmitting movement of the reset plunger in a circuit opening direction to the movable contact to cause the same to move out of engagement with the fixed contacts, and an actuator for resetting the plunger, said actuator when actuated for resetting purposes effecting a camming action between the bevelled edge of the wedge and the bevelled apron on the plunger, whereby the plunger is moved in a circuit closing direction.

2. A protective switch as defined by claim 1, additionally including current responsive means for holding the reset plunger latched in a retracted position against the tension of the additional means and under safe current conditions, whereby when said safe current conditions exist the movable contact is permitted to close.

3. In a protective switch, the combination with a pair of spaced fixed contacts, a movable contact for engagement therewith to close an electrical circuit and a coil spring for yieldingly biasing the movable contact in a circuit closing direction, of a reset plunger and a second coil spring for yieldingly biasing the reset plunger in a circuit opening direction, a heat responsive spindle assembly for latching the plunger in a retracted position against the tension of said second coil spring, a camming wedge interposed between the plunger and the movable contact and operative to transmit movement of the reset plunger in a circuit opening direction to the movable contact, an actuator reciprocable in a direction at right angles to the movement of the plunger, said actuator effecting movement of the wedge to cause a camming action between the wedge and the plunger for re-latching the plunger following movement thereof in a circuit opening direction, said wedge having bifurcated legs positioned between the pair of fixed contacts, and said actuator having a reduced end located between the legs and having a shoulder adapted to have contact with the wedge.

4. In a thermal overload and reset assembly, the combination with a housing of insulating material, of a pair of spaced contacts fixed to the housing, a movable contact for engagement therewith to close an electrical circuit, a spring for yieldingly biasing the movable contact in a circuit closing direction, a reset plunger within the housing, a second spring yieldingly biasing the reset plunger in a circuit opening direction, a camming wedge interposed between the movable contact and the reset plunger, said wedge having leg portions located between the fixed contacts and engaging with the movable contact, said wedge also having a bevelled edge for camming engagement with a bevelled apron on the reset plunger, said wedge being operative to transmit movement of the reset plunger in a circuit opening direction to the movable contact, a heat responsive spindle assembly for holding the reset plunger in a retracted position against the tension of said second spring, whereby with the plunger so positioned the movable contact is free to engage the fixed contacts to close the electrical circuit, an actuator mounted for reciprocation in a direction at right angles to that of the plunger, posts provided by the housing and extending parallel to the reciprocations of the actuator, said actuator when actuated for resetting purposes effecting a retracting movement of the plunger by causing a camming action between the wedge and plunger, whereby the plunger is retracted and held in reset position, and said wedge having a sliding engagement with the posts when the wedge is actuated to cause said camming action.

5. In a thermal overload and reset asesmbly, the combination with circuit control means including a movable contact, spring means for yieldingly maintainng the movhaving movement in one direction for effecting movement of the movable contact into an open circuit position, said reset plunger having movement in an opposite direction for resetting purposes, a current responsive spindle assembly for resetting the reset plunger by latching the same to prevent movement in said first mentioned direction, a camming wedge normally interposed between the movable contact and the reset plunger, said wedge and plunger having camming surfaces respectively and which operatively coact for transmitting movement of the reset plunger in said first mentioned direction through the wedge to the movable contact, means including an actuator for effecting movement of the wedge in a direction at right angles to the movement of the reset plunger, said wedge being operatively positioned for engagement by the actuator only when the reset plunger has been moved in said first mentioned direction to effect an open circuit position of the movable contact, and said wedge having operative camming relation with the reset plunger by means of said camming surfaces when the actuator thus engages the wedge and is actuated for moving the plunger in a resetting direction.

6. In a protective switch, the combination with a pair of spaced fixed contacts, a movable contact for engagement therewith to close an electrical circuit and a coil spring for yieldingly biasing the movable contact in a circuit closing direction, of a reset plunger support for movement parallel to that of the movable contact, said plunger having a latched and a tripped position whereby to respectively effect a closed circuit and an open circuit position of the movable contact, a heat responsive spindle assembly for holding the plunger in a latched position as long as safe current conditions exist, a camming wedge normally interposed between the plunger and the movable contact and operative to transmit movement of the reset plunger when tripped to the movable contact to cause the same to move out of engagement with the fixed contacts, an actuator reciprocable in a direction at right angles to the movement of the reset plunger, said actuator and wedge having such associated relation that when the actuator is reciprocated for resetting purposes it moves the wedge to cause a camming of the plunger into its latched position; said wedge having bifurcated legs integral therewith and which are located between the pair of fixed contacts, and said actuator having a reduced end located between the legs and also having a shoulder for operative engagement with the wedge, whereby the movable contact is permitted to close as a result of a resetting actuation of the actuator provided the plunger is re-latched and following a retraction of the actuator to free the wedge as regards its camming engagement with the plunger.

References Cited in the file of this patent

UNITED STATES PATENTS

| | | |
|---|---|---|
| 2,006,954 | Kuhn | July 2, 1935 |
| 2,040,181 | Mekelburg | May 12, 1936 |
| 2,082,660 | Schmitt | June 1, 1937 |
| 2,416,253 | Furnas | Feb. 18, 1947 |
| 2,702,321 | Brown et al. | Feb. 15, 1955 |

UNITED STATES PATENT OFFICE
CERTIFICATION OF CORRECTION

Patent No. 2,971,072                                  February 7, 1961

Dale F. Willcox et al.

It is hereby certified that error appears in the above numbered patent requiring correction and that the said Letters Patent should read as corrected below.

Column 3, line 38, for "bifrucated" read -- bifurcated --; column 6, line 70, for "maintainng" read -- maintaining --; column 7, line 5, strike out "able contact in circuit closed position, a reset plunger" and insert the same after "mov-" in column 6, line 70.

Signed and sealed this 20th day of June 1961.

(SEAL)
Attest:

ERNEST W. SWIDER                                  DAVID L. LADD
Attesting Officer                                     Commissioner of Patents